United States Patent
Nakagaki et al.

(10) Patent No.: US 12,162,777 B2
(45) Date of Patent: Dec. 10, 2024

(54) POSITIVE ELECTRODE ACTIVE MATERIAL IN WHICH ALUMINUM IS DISPERSED UNIFORMLY

(71) Applicant: KABUSHIKI KAISHA TOYOTA JIDOSHOKKI, Kariya (JP)

(72) Inventors: Yoshihiro Nakagaki, Kariya (JP); Jun Saida, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 368 days.

(21) Appl. No.: 17/626,691

(22) PCT Filed: Jul. 10, 2020

(86) PCT No.: PCT/JP2020/027036
§ 371 (c)(1),
(2) Date: Jan. 12, 2022

(87) PCT Pub. No.: WO2021/010321
PCT Pub. Date: Jan. 21, 2021

(65) Prior Publication Data
US 2022/0274846 A1    Sep. 1, 2022

(30) Foreign Application Priority Data

Jul. 18, 2019  (JP) ................................. 2019-133170
Sep. 17, 2019  (JP) ................................. 2019-168833

(51) Int. Cl.
| C01G 53/00 | (2006.01) |
| H01M 4/525 | (2010.01) |
| H01M 10/0525 | (2010.01) |
| H01M 4/02 | (2006.01) |

(52) U.S. Cl.
CPC ............ *C01G 53/42* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 6,071,489 | A | 6/2000 | Sun et al. |
| 7,838,152 | B2 | 11/2010 | Cheon et al. |
| 9,825,294 | B2 | 11/2017 | Oh et al. |
| 9,837,661 | B2 | 12/2017 | Kim et al. |
| 10,249,873 | B2 | 4/2019 | Kim et al. |
| 2006/0093920 | A1 | 5/2006 | Cheon et al. |
| 2013/0252109 | A1 | 9/2013 | Oh et al. |
| 2016/0260965 | A1* | 9/2016 | Wu ........................ H01M 4/366 |
| 2016/0268594 | A1 | 9/2016 | Kim et al. |
| 2018/0040882 | A1 | 2/2018 | Kim et al. |
| 2020/0058937 | A1 | 2/2020 | Kim et al. |

FOREIGN PATENT DOCUMENTS

| CN | 106410187 A | * | 2/2017 | ........ H01M 10/0525 |
| JP | 63-121260 A | | 5/1988 | |
| JP | 10-29820 A | | 2/1998 | |
| JP | 10-81521 A | | 3/1998 | |
| JP | 10-247497 A | | 9/1998 | |
| JP | 2006-128119 A | | 5/2006 | |
| JP | 2006-278341 A | | 10/2006 | |
| JP | 2013-89454 A | | 5/2013 | |
| JP | 2013-541141 A | | 11/2013 | |
| JP | 2014-139926 A | | 7/2014 | |
| JP | 2017-69135 A | | 4/2017 | |
| JP | 2017-195020 A | | 10/2017 | |
| JP | 2017-536685 A | | 12/2017 | |
| JP | 2018-22689 A | | 2/2018 | |
| JP | 2020-27800 A | | 2/2020 | |
| JP | 2020-149950 A | | 9/2020 | |
| JP | 2020-149954 A | | 9/2020 | |

OTHER PUBLICATIONS

International Search Report issued Oct. 6, 2020 in International Application No. PCT/JP2020/027036.

* cited by examiner

*Primary Examiner* — Tanisha Diggs
(74) *Attorney, Agent, or Firm* — Sughrue Mion, PLLC

(57) ABSTRACT

Provided is a positive electrode active material in which aluminum is dispersed uniformly.
A positive electrode active material is crystalline oxide that contains lithium, nickel, and aluminum, and aluminum is dispersed uniformly in a primary particle in the oxide.

6 Claims, 1 Drawing Sheet

POSITIVE ELECTRODE ACTIVE MATERIAL IN WHICH ALUMINUM IS DISPERSED UNIFORMLY

CROSS REFERENCE TO RELATED APPLICATIONS

This application is a National Stage of International Application No. PCT/JP2020/027036 filed Jul. 10, 2020, claiming priority based on Japanese Patent Application No. 2019-133170 filed Jul. 18, 2019 and Japanese Patent Application No. 2019-168833 filed Sep. 17, 2019.

TECHNICAL FIELD

The present invention relates to a positive electrode active material containing lithium, nickel, and aluminum.

BACKGROUND ART

Various materials are known to be used for positive electrode active materials of lithium ion secondary batteries. Among them, lithium-nickel oxide represented by $LiNiO_2$ was generally used as a positive electrode active material initially when a lithium ion secondary battery was developed, as described in Patent Literature 1.

Furthermore, lithium nickel metal oxide obtained by substituting a part of nickel in $LiNiO_2$ with another metal has been developed, and research for a lithium ion secondary battery in which the lithium nickel metal oxide is used as a positive electrode active material has been vigorously performed. Particularly, in recent years, a lithium ion secondary battery including, as a positive electrode active material, lithium-nickel-cobalt-aluminum oxide that has a layered rock-salt structure and that is obtained by substituting a part of nickel in $LiNiO_2$ with cobalt and aluminum, has been frequently reported.

Patent Literature 2 specifically describes a lithium ion secondary battery in which $LiNi_{0.81}Co_{0.15}Al_{0.04}O_2$ is adopted as a positive electrode active material.

Patent Literature 3 specifically describes a lithium ion secondary battery in which $LiNi_{0.8}Co_{0.16}Al_{0.04}O_2$ or $LiNi_{0.8}Co_{0.15}Al_{0.04}O_{1.9}F_{0.1}$ is adopted as a positive electrode active material.

Patent Literature 4 specifically describes a lithium ion secondary battery in which $LiNi_{0.8}Co_{0.15}Al_{0.05}O_2$ is adopted as a positive electrode active material.

Patent Literature 5 specifically describes a lithium ion secondary battery in which $Li_{1.013}Ni_{0.831}Co_{0.15}Al_{0.050}O_2$, $Li_{1.013}Ni_{0.858}Co_{0.123}Al_{0.020}O_2$, or $Li_{1.013}Ni_{0.867}Co_{0.098}Al_{0.035}O_2$ is adopted as a positive electrode active material.

CITATION LIST

Patent Literature

Patent Literature 1: JP63-121260A
Patent Literature 2: JP2006-128119A
Patent Literature 3: JP2006-278341A
Patent Literature 4: JP2014-139926A
Patent Literature 5: JP2017-195020A

SUMMARY OF INVENTION

Technical Problem

In general, lithium-nickel-cobalt-aluminum oxide is produced in a manner in which nickel, cobalt, and aluminum are coprecipitated as hydroxide from an aqueous solution in which nickel, cobalt, and aluminum are dissolved, the hydroxide containing nickel, cobalt, and aluminum is isolated, and the hydroxide and a lithium compound are subsequently mixed and baked. The lithium-nickel-cobalt-aluminum oxide produced in the above-described production method is used as a positive electrode active material.

However, the inventors of the present invention have found that aluminum is unevenly distributed in the positive electrode active material produced in the above-described production method.

The present invention has been made in view of such circumstances, and an object of the present invention is to provide a positive electrode active material in which aluminum is dispersed uniformly.

Solution to Problem

The inventors of the present invention have considered that aluminum is unevenly distributed in a positive electrode active material produced in a conventional standard production method due to aluminum being deposited more easily than other transition metals in a coprecipitation step. The inventors of the present invention have developed, as a result of thorough research, a technique in which all of aluminum and the other transition metals are coprecipitated in the same pH range by adding a chelate compound to a metal aqueous solution in which the aluminum and the other transition metals are dissolved, to improve solubility of the aluminum in water, and then controlling the pH of the metal aqueous solution. The inventors of the present invention have successfully produced a positive electrode active material in which aluminum is dispersed uniformly in a primary particle, by using the technique.

A positive electrode active material of the present invention is crystalline oxide that contains lithium, nickel, and aluminum, in which aluminum is dispersed uniformly in a primary particle in the oxide.

Advantageous Effects of Invention

The present invention provides a positive electrode active material in which aluminum is dispersed uniformly.

DESCRIPTION OF EMBODIMENTS

Figure 1:
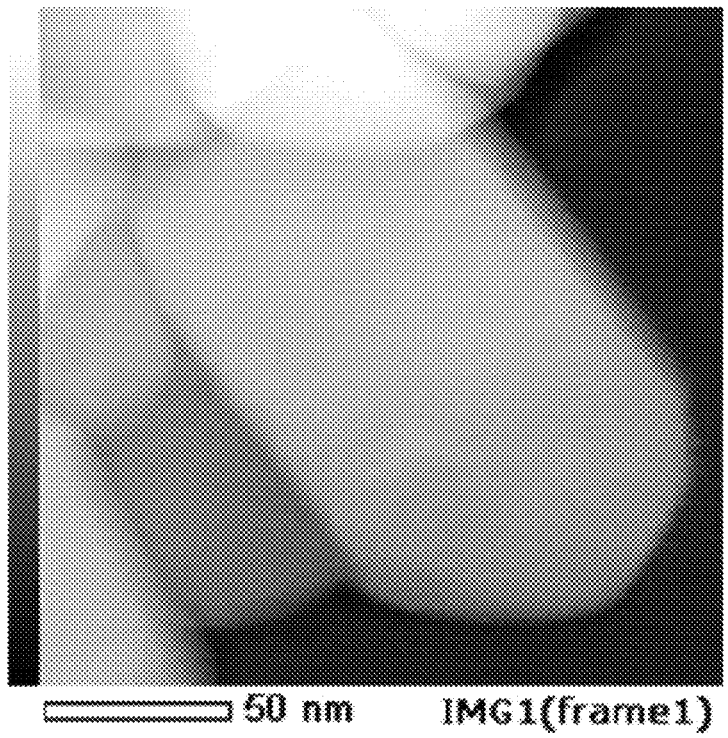
FIG. 1 illustrates an STEM image of a positive electrode active material of Example 1.

The following describes embodiments of the present invention. Unless mentioned otherwise in particular, a numerical value range of "x to y" in the description herein includes, in the range thereof, a lower limit "x" and an upper limit "y". A numerical value range can be formed by arbitrarily combining such upper limit values, lower limit values, and numerical values described in Examples. In addition, numerical values arbitrarily selected within a numerical value range may be used as upper limit and lower limit numerical values.

A positive electrode active material of the present invention is crystalline oxide that contains lithium, nickel, and aluminum, and aluminum is dispersed uniformly in a primary particle in the oxide.

In the description herein, "aluminum is dispersed uniformly in a primary particle" means that, when a concentration of aluminum on a cross-section of a primary particle is analyzed, a relative standard deviation for the concentration of aluminum per cross-sectional area of 400 nm² on the cross-section is not greater than 20%.

The relative standard deviation for the concentration of aluminum is calculated by the following equation.

Relative standard deviation (%)=100×(standard deviation for concentration of aluminum per cross-sectional area of 400 nm²)/(average value of concentrations of aluminum per cross-sectional area of 400 nm²)

The relative standard deviation for the concentration of aluminum preferably has a small value. A range of the relative standard deviation for the concentration of aluminum is, for example, 0.1% to 20%, 0.5% to 15%, 1% to 12%, or 2% to 10%.

The primary particle represents a particle as a single crystal structure having the same crystal orientation, and represents a particle recognized as one particle when observed by an electron microscope.

The particle diameter of the primary particle is preferably small. This is because, when the primary particle functions as a positive electrode active material, reduction in charge transfer resistance is expected, and, as a result, charging/discharging at a high rate and charging/discharging at a low temperature are expected to smoothly progress. However, a primary particle having an excessively small particle diameter is not considered to be preferable. This is because unpreferable reaction is likely to occur.

The mean particle diameter of the primary particles is preferably in a range of 20 nm to 500 nm, more preferably in a range of 30 nm to 300 nm, even more preferably in a range of 50 nm to 200 nm, and particularly preferably in a range of 70 nm to 150 nm. In a case where kinds of metals of the positive electrode active material of the present invention are the same, increase of a content of aluminum tends to decrease the particle diameter of the primary particle.

In the description herein, the particle diameter of the primary particle represents a diameter that is calculated in such a manner that an electron microscope image of a cross-section of the primary particle is image-analyzed to calculate a cross-sectional area of the primary particle, and the diameter is calculated from the cross-sectional area on the assumption that the primary particle has a round cross-section. The mean particle diameter of the primary particles represents an arithmetic mean value of particle diameters of the primary particles.

The particle diameters of the primary particles are preferably uniform to some extent. The relative standard deviation for the particle diameter of the primary particle is preferably not greater than 50%. A range of the relative standard deviation for the particle diameter of the primary particle is, for example, 1% to 50%, 5% to 40%, or 10% to 35%.

The positive electrode active material of the present invention is produced as secondary particles which are aggregates of a plurality of primary particles. The mean particle diameter in the positive electrode active material of the present invention is preferably in a range of 1 to 30 μm, more preferably in a range of 3 to 20 μm, and even more preferably in a range of 5 to 15 μm.

The mean particle diameter in the positive electrode active material of the present invention represents $D_{50}$ measured by a laser scattering/diffraction type particle size distribution analyzer.

In the particle size distribution of the positive electrode active material of the present invention in the measurement by the laser scattering/diffraction type particle size distribution analyzer, a value of $D_{90}-D_{10}$ is preferably not less than 10 μm or a value of $(D_{90}-D_{10})/D_{50}$ is preferably not less than 0.6. These parameters indicate that the particle size distribution of the secondary particles in the positive electrode active material of the present invention is broad. In a case where the particle size distribution is broad, the shape of the frequency distribution of the particle diameters has a single peak or is multimodal.

The positive electrode active material having a broad particle size distribution is appropriate for production in a reproducible manner also in a case where, for example, scales of production facilities and conditions in a production method are changed. Furthermore, in a case where a positive electrode is produced, small positive electrode active material particles are inserted between large positive electrode active material particles in a step of forming a positive electrode active material layer on a current collector of the positive electrode, so that a high-density positive electrode active material layer is formed by using the positive electrode active material having the broad particle size distribution.

The range of $D_{90}-D_{10}$ is, for example, 10 μm to 30 μm, 12 μm to 25 μm, or 14 μm to 20 μm. The range of $(D_{90}-D_{10})/D_{50}$ is, for example, 0.6 to 2, 0.8 to 1.8, or 1 to 1.6.

A crystal structure of the positive electrode active material of the present invention is, for example, a rock-salt structure, a layered rock-salt structure, or a spinel structure, depending on contents of lithium, nickel, aluminum, oxygen, and other elements, and is particularly preferably a layered rock-salt structure.

In the positive electrode active material of the present invention, lithium serves as a charge carrier. Lithium is extracted from a lithium site in the crystal structure during charging, and is inserted in the lithium site in the crystal structure during discharging. Nickel is considered to preferentially contribute to an oxidation-reduction reaction during charging/discharging. Aluminum is considered to contribute to retaining of the crystal structure.

In the positive electrode active material of the present invention, preferable examples of oxide include oxide that has a layered rock-salt structure and is represented by the following general formula (1).

$$Li_aNi_bAl_cM_dD_eO_fF_g \qquad \text{General formula (1)}$$

In general formula (1), a, b, c, d, e, f, and g satisfy $0.55 \le a \le 2$, $0 < b < 1$, $0 < c \le 0.2$, $0 \le d < 1$, $0 \le e \le 0.2$, $b+c+d+e=1$, $1.8 \le f \le 2.2$, and $0 \le g \le 0.2$. M is selected from Co, Mn, W, and Zr. D represents a doping element.

In the general formula, a value of b exerts a great influence on a capacity of the positive electrode active material. In the general formula, b preferably satisfies $0.85 \le b \le 0.99$, more preferably satisfies $0.9 \le b \le 0.98$, and even more preferably satisfies $0.93 \le b \le 0.97$.

In the general formula, c preferably satisfies $0.001 \le c \le 0.1$, more preferably satisfies $0.001 \le c \le 0.09$, even more preferably satisfies $0.001 \le c \le 0.05$, still further preferably satisfies $0.001 \le c \le 0.03$, and particularly preferably satisfies $0.002 \le c \le 0.01$.

In the general formula, d preferably satisfies $0.001 \leq d < 1$ or $0 \leq d \leq 0.2$, more preferably satisfies $0.001 \leq d \leq 0.1$, even more preferably satisfies $0.003 \leq d \leq 0.07$, and particularly preferably satisfies $0.005 \leq d \leq 0.05$.

$M_d$ is also represented as $(Co_{d1}, Mn_{d2}, W_{d3}, Zr_{d4})$ $d = d1 + d2 + d3 + d4$ is satisfied.

A range of d1 is, for example, $0 \leq d1 \leq 0.2$, $0.001 \leq d1 \leq 0.1$, $0.01 \leq d1 \leq 50.08$, or $0.03 \leq d1 \leq 0.06$.

A range of d2 is, for example, $0 \leq d2 \leq 0.1$, $0.001 \leq d2 \leq 0.08$, $0.005 \leq d2 \leq 0.05$, or $0.01 \leq d2 \leq 0.03$.

A range of d3 is, for example, $0 \leq d3 \leq 0.1$, $0.001 \leq d3 \leq 0.05$, $0.003 \leq d3 \leq 0.03$, or $0.004 \leq d3 \leq 0.01$.

A range of d4 is, for example, $0 \leq d4 \leq 0.1$, $0.001 \leq d4 \leq 0.05$, $0.002 \leq d4 \leq 0.01$, or $0.002 \leq d4 \leq 0.008$.

a, e, f, and g are values in the ranges defined by the general formula, and, for example, preferably satisfy $0.55 a \leq 1.5$, $0 \leq e \leq 0.1$, $1.8 \leq f \leq 2.1$, and $0 < g \leq 0.15$, and more preferably satisfy $0.8 \leq a \leq 1.3$, $0 < e \leq 0.01$, $1.9 \leq f \leq 2.1$, and $0 < g \leq 0.1$.

In the general formula, D represents a doping element, and represents an element that allows enhancement of properties of the positive electrode active material. In the general formula, F also represents an element that allows enhancement of properties of the positive electrode active material.

D represents, for example, Na, Ca, V, Cu, Sn, Tl, Fe, Sr, Ti, Ba, Y, a rare earth element, Os, Ir, Cd, Re, Bi, Rh, Cr, Zn, In, Pb, Ru, Nb, P, or S.

A production method for producing the positive electrode active material of the present invention in which aluminum is dispersed uniformly in the primary particle, is described.

The production method (hereinafter, also simply referred to as "production method of the present invention") for producing the positive electrode active material of the present invention includes a deposition step of mixing a basic substance and an aqueous solution in which nickel, aluminum, and a chelate compound are dissolved, and depositing transition metal hydroxide containing nickel and aluminum, a precursor forming step of heating the transition metal hydroxide and forming a precursor in which attached water has been removed or forming a precursor that is transition metal oxide, and a baking step of mixing and baking the precursor and lithium salt.

In the production method of the present invention, coprecipitation of nickel and aluminum in the deposition step is technically important.

The deposition step is described. Unless otherwise specified, the pH specified in the description herein represents a value obtained by measurement at 25° C.

In order to prepare the aqueous solution (hereinafter, also referred to as transition-metal-containing aqueous solution) in which nickel, aluminum, and a chelate compound are dissolved, a nickel compound and an aluminum compound are added to water at an appropriate ratio and a chelate compound is further added to dissolve these compounds in the water such that a metal composition ratio in transition metal hydroxide to be deposited is obtained.

Examples of the nickel compound include nickel sulfate, nickel carbonate, nickel nitrate, nickel acetate, and nickel chloride. Examples of the aluminum compound include aluminum sulfate, aluminum carbonate, aluminum nitrate, and aluminum chloride.

The chelate compound represents a compound that has a plurality of amino groups, amide groups, imide groups, imino groups, cyano groups, azo groups, hydroxy groups, alkoxy groups, carboxyl groups, ester groups, ether groups, carbonyl groups, phosphate groups, phosphoric ester groups, phosphonic acid groups, phosphonic ester groups, phosphinic acid groups, phosphinic ester groups, phosphenic acid groups, phosphenic acid ester groups, phosphenous acid groups, phosphenous acid ester groups, thiol groups, sulfide groups, sulfinyl groups, sulfonyl groups, sulfonic acid groups, thiocarboxyl groups, thioester groups, or thiocarbonyl groups which are coordinatable with a metal ion, and that is coordinatable with the metal ion at the plurality of the groups.

Specific examples of the chelate compound include: polyamine compounds such as ethylenediamine and diethylenetriamine; amino acid such as glycine, alanine, cysteine, glutamine, arginine, asparagine, aspartic acid, serine, and ethylenediaminetetraacetic acid; dicarboxylic acid such as malonic acid, succinic acid, glutaric acid, maleic acid, and phthalic acid; and hydroxycarboxylic acid.

As the chelate compound, hydroxycarboxylic acid is particularly preferable. Examples of hydroxycarboxylic acid having a hydroxy group and a carboxylic acid group in a molecule include aliphatic hydroxycarboxylic acids and aromatic hydroxycarboxylic acids.

Examples of the aliphatic hydroxycarboxylic acids include glycolic acid, lactic acid, tartronic acid, glyceric acid, 2-hydroxybutyric acid, 3-hydroxybutyric acid, γ-hydroxybutyric acid, malic acid, tartaric acid, citramalic acid, citric acid, isocitric acid, leucic acid, mevalonic acid, pantoic acid, quinic acid, and shikimic acid.

Examples of the aromatic hydroxycarboxylic acid include o-hydroxybenzoic acid derivatives such as salicylic acid, gentisic acid, and orsellinic acid, mandelic acid, benzilic acid, and 2-hydroxy-2-phenylpropionic acid.

The specific examples of the above-described hydroxycarboxylic acid each form a conformation in which an OH group and a $CO_2H$ group are coordinatable with the same metal ion.

In general, metal hydroxide is known to be deposited in a case where a metal aqueous solution has a basic pH. The pH at which metal hydroxide is deposited depends on a kind of the metal. Therefore, in a case where a basic substance is added to a metal aqueous solution in which a plurality of kinds of metal ions are dissolved, to cause the metal aqueous solution to have a basic pH, a kind of metal hydroxide deposited is different for each pH. As a result, a composition of the metal hydroxide is assumed to vary.

However, in the production method of the present invention, the chelate compound is dissolved in the transition-metal-containing aqueous solution. The chelate compound is coordinated with a metal ion and forms a stable complex, so that solubility of metal ions in water is enhanced. Therefore, a metal deposited at a relatively low pH under a condition that a chelate compound is absent is deposited at a high pH in the transition-metal-containing aqueous solution in which the chelate compound is dissolved. As a result, both nickel and aluminum are deposited as hydroxide in the same pH range.

According to comparison between solubility of nickel in basic water and solubility of aluminum in basic water, aluminum has poor solubility. In the production method of the present invention, the chelate compound is added to the transition-metal-containing aqueous solution in order to enhance solubility of aluminum.

A molar ratio of the chelate compound to aluminum in the transition-metal-containing aqueous solution is preferably not less than 1, preferably in a range of 1 to 10, more preferably in a range of 1.5 to 8, and even more preferably in a range of 2 to 6.

In order to prepare the transition-metal-containing aqueous solution, a reactor that includes a stirrer is preferably used, and a reactor that includes a device capable of introducing inert gas such as nitrogen and argon is more preferably used. A reactor that includes a device maintaining a constant temperature is even more preferably used.

The transition-metal-containing aqueous solution is heated preferably to 40 to 90° C. and more preferably to 40 to 80° C.

In order to mix the transition-metal-containing aqueous solution and the basic substance while the pH is preferably controlled, use of a basic aqueous solution as the basic substance is reasonable.

A basic compound is dissolved in water in order to prepare the basic aqueous solution.

In order to prepare the basic aqueous solution, a reactor that includes a stirrer is preferably used, and a reactor that includes a device capable of introducing inert gas such as nitrogen and argon is more preferably used. A reactor that includes a device maintaining a constant temperature is even more preferably used.

The pH of the basic aqueous solution is preferably in a range of 11 to 14, more preferably in a range of 11 to 13, and even more preferably in a range of 11 to 12. The basic compound to be used is a compound that is dissolved in water to indicate basicity. Examples of the basic compound include: ammonia; alkali metal hydroxide such as sodium hydroxide, potassium hydroxide, and lithium hydroxide; alkali metal carbonate such as sodium carbonate, potassium carbonate, and lithium carbonate; alkali metal phosphate such as trisodium phosphate, tripotassium phosphate, and trilithium phosphate; and alkali metal acetate such as sodium acetate, potassium acetate, and lithium acetate. The basic compound is used alone or a plurality of the basic compounds are used in combination.

In the deposition step, the pH of a reaction solution is preferably maintained in a preferable range. Therefore, the basic aqueous solution preferably contains a basic compound having at least a buffering function. Examples of the basic compound having the buffering function include ammonia, alkali metal carbonates, alkali metal phosphates, and alkali metal acetates.

The basic aqueous solution is heated preferably to 40 to 90° C. and more preferably to 40 to 80° C.

In the deposition step, the transition-metal-containing aqueous solution and the basic substance are mixed, whereby metal ions and hydroxide ions react with each other, to generate and deposit transition metal hydroxide containing nickel and aluminum having low solubility in water. Particles of the deposited transition metal hydroxide are a basis of the primary particles of the positive electrode active material of the present invention. Therefore, if the deposition step is performed under a condition that a rate at which transition metal hydroxide is deposited is significantly high, that is, a condition that cores of the transition metal hydroxide are generated everywhere, particles of the transition metal hydroxide are disorderly formed, resulting in unpreferable crystal habit being generated in the primary particle of the positive electrode active material of the present invention. Therefore, in the deposition step, particles of the transition metal hydroxide are preferably deposited under as mild a condition as possible.

In the deposition step, a reaction solution in which the transition-metal-containing aqueous solution and the basic substance are mixed is preferably maintained so as to have a constant pH. Here, the value of the pH represents a value itself obtained by measuring the reaction solution by a pH meter. The pH is preferably in a range of 10 to 14, more preferably in a range of 10 to 12, and particularly preferably in a range of 10 to 11.

The deposition step is preferably performed in a reactor that includes a stirrer, and is more preferably performed in a reactor that includes a device capable of introducing inert gas such as nitrogen and argon. A reactor that includes a device maintaining a constant temperature is even more preferably used.

In the deposition step, an amount of dissolved oxygen in a reaction system is preferably small. If an amount of dissolved oxygen in the reaction system is large, unpreferable oxidation is likely to occur or preferable crystallization of transition metal hydroxide according to deposition of the transition metal hydroxide is likely to be inhibited.

In order to reduce an amount of dissolved oxygen in the reaction system, the deposition step is preferably performed in a heated state, performed in the presence of a deoxidizer, a reductant, an antioxidant, or the like, or performed while inert gas is being introduced into the reaction system.

For the heated state, the temperature is, for example, in a range of 40 to 90° C. or 60 to 80° C.

Examples of the inert gas include nitrogen, argon, and helium.

Examples of the deoxidizer, the reductant, and the antioxidant include ascorbic acid and salts thereof, glyoxylic acid and salts thereof, hydrazine, dimethylhydrazine, hydroquinone, dimethylamine borane, $NaBH_4$, $NaBH_3CN$, $KBH_4$, sulfurous acid and salts thereof, thiosulfuric acid and salts thereof, pyrosulfurous acid and salts thereof, phosphorous acid and salts thereof, and hypophosphorous acid and salts thereof.

After the deposition step, the transition metal hydroxide is separated through filtration or the like. The transition metal hydroxide is obtained in the above-described method. The following invention is acquired from the viewpoint that the transition metal hydroxide produced in the deposition step is a production intermediate of the positive electrode active material of the present invention.

Nickel-aluminum-containing hydroxide which is hydroxide having a form of a particle and containing nickel and aluminum and in which aluminum is dispersed uniformly in the particle.

To the transition-metal-containing aqueous solution in the deposition step, a compound containing the metal M (that is, metal selected from Co, Mn, W, and Zr) other than lithium, nickel, and aluminum, and/or a compound containing the doping element may be added to produce transition metal hydroxide containing the metal M and/or the doping element.

Next, the precursor forming step is described. In the precursor forming step, the transition metal hydroxide is heated to form transition metal hydroxide in which attached water has been removed, or the transition metal hydroxide is heated to form transition metal oxide. Each of the transition metal hydroxide in which attached water has been removed and the transition metal oxide is a precursor of the positive electrode active material.

The heating temperature is preferably in a range of 100 to 800° C., more preferably in a range of 200 to 700° C., and particularly preferably in a range of 300 to 600° C. The precursor forming step is performed under a normal pressure or a reduced pressure.

The following invention is acquired from the viewpoint that the transition metal oxide produced in the precursor forming step is a production intermediate of the positive electrode active material of the present invention.

Nickel-aluminum-containing oxide which is oxide having a form of a particle and containing nickel and aluminum and in which aluminum is dispersed uniformly in the particle.

Next, the baking step is described. In the baking step, the precursor and lithium salt are mixed and baked.

Examples of the lithium salt include lithium carbonate, lithium hydroxide, lithium nitrate, lithium acetate, lithium oxalate, and lithium halide. A blending amount of the lithium salt is determined as appropriate such that the positive electrode active material has a lithium composition as desired.

Examples of a mixing device include a mortar and pestle, a stirring mixer, a V-type mixer, a W-type mixer, a ribbon mixer, a drum mixer, and a ball mill.

In the baking step, a compound other than the lithium salt may be mixed. Particularly, a compound selected from an Na compound, an F compound, and a P compound is preferably mixed. In a case where Na, F, or P is present, rate characteristics and/or a capacity retention rate of a lithium ion secondary battery including the positive electrode active material of the present invention are expected to be improved.

Examples of the Na compound include sodium salts such as NaF, NaCl, NaBr, NaI, $Na_3PO_4$, $Na_2HPO_4$, $NaH_2PO_4$, $Na_2SO_4$, $NaHSO_4$, $NaNO_3$, and $CH_3CO_2Na$.

Examples of the F compound include metal fluorides such as LiF, NaF, KF, $MgF_2$, $CaF_2$, $BaF_2$, and $AlF_3$.

Examples of the P compound include phosphoric acid and phosphates such as $H_3PO_4$, $LiH_2PO_4$, $Li_2HPO_4$, $Li_3PO_4$, $NaH_2PO_4$, $Na_2HPO_4$, $Na_3PO_4$, $KH_2PO_4$, $K_2HPO_4$, and $K_3PO_4$.

The baking is performed in an air atmosphere, in an oxygen gas atmosphere, or in the presence of inert gas such as helium and argon. In the baking, the heating temperature is, for example, in a range of 400 to 1100° C., 500 to 1000° C., or 600 to 800° C. In the baking, the heating time is, for example, 1 to 50 hours.

The baking is performed under a single temperature condition or under a combination of a plurality of the baking steps in which temperature conditions are different, or a specific temperature rising program is set.

A method for using a combination of a plurality of the baking steps in which temperature conditions are different include, for example, a first baking step of performing heating at 400 to 800° C. to obtain a first baked object, and a second baking step of heating the first baked object at 550 to 1000° C. By combining a plurality of the baking steps, a preferable positive electrode active material is produced.

The temperature for the first baking step is, for example, in a range of 400 to 800° C. or 650 to 750° C. In the first baking step, the heating time is, for example, in a range of 3 to 30 hours, 5 to 20 hours, or 5 to 15 hours.

In the second baking step, the first baked object is heated at 550 to 1000° C.

Here, in a case where crystals of the positive electrode active material are generated, crystals having uniform shapes are likely to be generated by performing heating at as low a temperature as possible. Therefore, the temperature for the second baking step is, for example, in a range of 550 to 950° C., 550 to 900° C., 550 to 850° C., or 550 to 800° C.

In the second baking step, the heating time is, for example, in a range of 3 to 30 hours, 5 to 20 hours, or 5 to 15 hours.

The baked object obtained in the baking step is preferably formed into the positive electrode active material in which the particle size distribution is uniform, through a pulverizing step or a classification step.

In the production method of the present invention, a coating step of coating the precursor with a metal compound may be performed before the baking step. That is, the positive electrode active material of the present invention may be produced in a production method (hereinafter, also referred to as a second production method of the present invention) in which, subsequent to the precursor forming step, the coating step of coating the precursor with a metal compound is performed, and the baking step is thereafter performed.

The coating step is described. In the coating step, the "transition metal hydroxide in which attached water has been removed" or the "transition metal oxide" as the precursor is coated with a metal compound to obtain a coated object.

A case where the "transition metal oxide" is coated with a metal compound is described below. In a case where the "transition metal hydroxide in which attached water has been removed" is coated with a metal compound, the "transition metal oxide" may be replaced as appropriate by the "transition metal hydroxide in which attached water has been removed" when the following description is read.

Specific examples of the metal compound include metal oxides selected from $ZrO_2$, $CaVO_3$, $MnO_2$, $La_2CuO_4$, $La_2NiO_4$, $SnO_2$, $Tl_2Mn_2O_7$, $EuO$, $Fe_2O_3$, $CaMnO_3$, $SrMnO_3$, (Sr, La) $TiO_3$, $LaTiO_3$, $SrFeO_3$, $BaMoO_3$, $CaMoO_3$, $Ln_2Os_2O_7$ (Ln represents an element selected from Y and rare earth elements), $Tl_2Ir_2O_7$, $Cd_2Re_2O_7$, $Lu_2Ir_2O_7$, $Bi_2Rh_2O_7$, $Bi_2Ir_2O_7$, $Ti_2O_3$, $WO_2$, $VO$, $V_2O_3$, $LaMnO_3$, $CaCrO_3$, $LaCoO_3$, $(ZnO)_5$, $SrCrO_3$, $In_{0.97}Y_{0.03}O_3$, $Zn_xAl_yO$ (x+y=1), $LiV_2O_4$, $Na_{1-x}CoO_2$ (0<x<1), $LiTi_2O_4$, $SrMoO_3$, $BaPbO_3$, $Tl_2Os_2O_7$, $Pb_2Os_2O_7$, $Pb_2Ir_2O_7$, $Lu_2Ru_2O_7$, $Bi_2Ru_2O_7$, $SrRuO_3$, $CaRuO_3$, $CrO_2$, $MoO_2$, $ReO_2$, $TiO$, $LaO$, $SmO$, $LaNiO_3$, $SrVO_3$, $ReO_3$, $IrO_2$, $RuO_2$, $RhO_2$, $OsO_2$, $NdO$, $NbO$, $La_2O_3$, $NiO$, $LaSr_xCo_yO_3$ (x+y=1), $NaCoO_3$, $NaNiO_3$, $LiCoO_3$, $LiNiO_3$, and metal hydroxides as precursors of the metal oxides.

Among the metal compounds, the metal oxide having, for example, a perovskite-type crystal structure is preferable.

In order to coat the transition metal oxide with the metal compound, a method in which an aqueous solution having the precursor of each metal compound or each metal dissolved therein is sprayed onto the transition metal oxide, and the obtained product is subsequently or simultaneously dried, is adopted. Furthermore, a method in which the transition metal oxide is immersed in an aqueous solution having the precursor of each metal compound or each metal dissolved therein, to adhere hydroxide of the precursor of the metal compound or the metal, or the like to the surface of the transition metal oxide, and the obtained product is heated and dried, is adopted. Particularly, a method (hereinafter, also referred to as deposition method) in which a dispersion liquid of the transition metal oxide and an aqueous solution having the precursor of each metal compound or each metal dissolved therein are mixed to deposit hydroxide of each metal on the surface of the transition metal oxide, and the obtained product is dried, is preferably adopted.

A preferable deposition method in the case of a metal in the metal compound being Zr is described below in detail. The deposition method includes a coat-1) step, a coat-2)

step, and a coat-3) step described below. In a case where a metal in the metal compound is a metal other than Zr, zirconium is replaced by the metal in the coat-1) step, the coat-2) step, and the coat-3) step when the description is read. Furthermore, in a case where the number of metals in the metal compound is plural, an aqueous solution containing the plurality of metals is used in the coat-2) step, or a kind of the metal in the metal aqueous solution is changed to repeat the coat-1) step, the coat-2) step, and the coat-3) step.

coat-1) a dispersion liquid preparation step of dispersing the transition metal oxide in water, coat-2) a zirconium deposition step of mixing the dispersion liquid and a zirconium aqueous solution containing a chelate compound, to deposit zirconium hydroxide on a surface of the transition metal oxide, coat-3) a step of drying the transition metal oxide having the zirconium hydroxide deposited on the surface, to obtain a coated object.

Before the coat-1) step, the transition metal oxide is preferably pulverized. The pH is preferably adjusted such that the pH of the dispersion liquid is in a range of about 9 to 12.

Next, the coat-2) step is described.

The zirconium aqueous solution containing a chelate compound is produced by dissolving a zirconium compound and the chelate compound in water. The zirconium aqueous solution containing the chelate compound is an acidic solution in general. A molar ratio of the chelate compound to zirconium in the zirconium aqueous solution is preferably not less than 1, preferably in a range of 1 to 10, more preferably in a range of 1.5 to 8, and even more preferably in a range of 2 to 6.

Examples of the zirconium compound include zirconium oxide, zirconium hydroxide, zirconium sulfate, zirconium nitrate, zirconium phosphate, and zirconium halide.

Description for the chelate compound is the same as the description thereof in the deposition step.

In the coat-2) step, the pH of the mixture in the coat-2) step is preferably controlled in order to efficiently deposit zirconium. Here, zirconium hydroxide having a low solubility is assumed to be deposited on the surface of the transition metal oxide by controlling the pH of the mixture such that the mixture indicates an alkaline pH. For example, a basic aqueous solution is preferably added such the pH of the solution in the coat-2) step is in a range of 9 to 13, 11 to 13, or 12 to 13. As the basic aqueous solution, the solution described for the deposition step is adopted.

The transition metal oxide subjected to the coat-2) step is separated through filtration or the like and is supplied for the coat-3) step.

In the coat-3) step, drying is preferably performed in a heated state and/or under a reduced pressure. The heating temperature is, for example, in a range of 100 to 500° C. or 200 to 400° C.

A main purpose of the drying in the coat-3) step is to remove a water content attached to the transition metal oxide having zirconium hydroxide deposited on the surface. However, by increasing the heating temperature, the zirconium hydroxide on the surface of the transition metal oxide may be dehydrated and changed into zirconium oxide. That is, the coated object is the transition metal oxide coated with zirconium hydroxide or the transition metal oxide coated with zirconium oxide.

In the second production method of the present invention, particles of the transition metal oxide are coated with the metal compound in the coating step, and, therefore, the metal compound in the coating serves as a barrier in the baking step, and nickel is considered to be inhibited from moving to a lithium site of a crystal structure such as a layered rock-salt structure.

The positive electrode active material of the present invention is used as a positive electrode active material of a lithium ion secondary battery. The lithium ion secondary battery (hereinafter, also referred to as lithium ion secondary battery of the present invention) that includes the positive electrode active material of the present invention is described below. Specifically, the lithium ion secondary battery of the present invention includes a positive electrode having the positive electrode active material of the present invention, a negative electrode, a solid electrolyte or electrolytic solution, and a separator.

The positive electrode has a current collector and a positive electrode active material layer bound to a surface of the current collector.

The current collector is a chemically inert electron conductor for continuously sending a current flow to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, and molybdenum, and a metal material such as stainless steel. The current collector may be coated with a known protective layer. A current collector having a surface treated in a known method may be used as the current collector.

The current collector is formed in, for example, foil, a sheet, a film, a line shape, a bar shape, and a mesh. Therefore, as the current collector, for example, metal foil such as copper foil, nickel foil, aluminum foil, or stainless steel foil is preferably used. In a case where the current collector is in the form of foil, a sheet, or a film, the thickness of the current collector is preferably in a range of 1 μm to 100 μm.

The positive electrode active material layer includes a positive electrode active material, and, as necessary, a conductive additive and/or a binding agent.

As the positive electrode active material, the positive electrode active material of the present invention is used alone, or the positive electrode active material of the present invention and a known positive electrode active material are used in combination.

The conductive additive is added to enhance conductivity of the electrode. Therefore, the conductive additive is added as appropriate in a case where conductivity of the electrode is insufficient, and the conductive additive need not be added in a case where the conductivity of the electrode is sufficiently excellent. The conductive additive is a chemically inert fine electron conductor, and examples thereof include carbonaceous fine particles such as carbon black, graphite, vapor grown carbon fiber, and various metal particles. Examples of the carbon black include acetylene black, KETJENBLACK (registered trademark), furnace black, and channel black. One of these conductive additives or a combination of two or more of them are added to the active material layer.

As a blending ratio of the conductive additive in the active material layer, a mass ratio is such that active material: conductive additive=1:0.005 to 1:0.5 is preferably satisfied, 1:0.01 to 1:0.2 is more preferably satisfied, and 1:0.03 to 1:0.1 is even more preferably satisfied. In a case where an amount of the conductive additive is excessively small, an efficient conducting path is not formed. Meanwhile, in a case where an amount of the conductive additive is excessively large, moldability of the active material layer deteriorates and energy density of the electrode becomes low.

The binding agent serves to adhere the active material and the conductive additive to the surface of the current collector, and maintain a conductive network in the electrode. Examples of the binding agent include: a fluorine-containing resin such as polyvinylidene fluoride, polytetrafluoroethylene, and fluororubber; a thermoplastic resin such as polypropylene and polyethylene; an imide-based resin such as polyimide and polyamide-imide; an alkoxysilyl group-containing resin; an acrylic resin such as poly(meth)acrylic acid; styrene-butadiene rubber (SBR); and carboxymethyl cellulose. One of the binding agents is used alone or a plurality of them are used.

As a blending ratio of the binding agent in the active material layer, a mass ratio is such that active material:binding agent=1:0.001 to 1:0.3 is preferably satisfied, 1:0.005 to 1:0.2 is more preferably satisfied, and 1:0.01 to 1:0.15 is even more preferably satisfied. In a case where an amount of the binding agent is excessively small, moldability of the electrode deteriorates. Meanwhile, in a case where an amount of the binding agent is excessively large, energy density of the electrode becomes low.

The negative electrode has a current collector and a negative electrode active material layer bound to a surface of the current collector. For the current collector, the current collector described for the positive electrode is adopted as appropriate. The negative electrode active material layer includes a negative electrode active material, and, as necessary, a conductive additive and/or a binding agent.

As the negative electrode active material, a known negative electrode active material is adopted. Examples of the negative electrode active material include a carbon-based material capable of occluding and releasing lithium, an element capable of forming an alloy with lithium, and a compound having an element capable of forming an alloy with lithium.

Examples of the carbon-based material include hardly graphitizable carbon, graphite, cokes, graphites, glassy carbons, organic polymer compound baked products, carbon fibers, activated carbon, and carbon blacks. Here, the organic polymer compound baked product refers to a carbonized product obtained by baking a polymer material such as phenol and furan at a suitable temperature.

Specific examples of the element capable of forming an alloy with lithium include Na, K, Rb, Cs, Fr, Be, Mg, Ca, Sr, Ba, Ra, Ti, Ag, Zn, Cd, Al, Ga, In, Si, Ge, Sn, Pb, Sb, and Bi. Si or Sn is particularly preferable.

Specific examples of the compound having an element capable of forming an alloy with lithium include ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO, and LiSnO. $SiO_x$ ($0.3\leq x\leq1.6$ or $0.5\leq x\leq1.5$) is particularly preferable.

The negative electrode active material preferably contains an Si-based material having Si. The Si-based material is preferably formed of silicon and/or a silicon compound capable of occluding and releasing lithium ions, and is, for example, preferably $SiO_x$ ($0.5\leq x\leq1.5$). Although silicon has a high theoretical charge/discharge capacity, a volume of silicon is greatly changed during charging/discharging. Therefore, by using $SiO_x$ containing silicon as the negative electrode active material, change of the volume of silicon is reduced.

As the negative electrode active material, an Si material that is produced by heating, at 300 to 1000° C., layered polysilane obtained by treating $CaSi_2$ with acid such as hydrochloric acid or hydrofluoric acid, is also adopted. Furthermore, a carbon-coated product obtained by heating the above-described Si material and a carbon source, is also adopted as the negative electrode active material.

As the negative electrode active material, one or more of the above-described materials are used.

As the conductive additive and the binding agent used for the negative electrode, the conductive additive and the binding agent described for the positive electrode are used as appropriate at similar blending ratios.

In order to form the active material layer on the surface of the current collector, the active material is applied to the surface of the current collector by using a conventionally known method such as a roll coating method, a die coating method, a dip coating method, a doctor blade method, a spray coating method, and a curtain coating method. Specifically, the active material, a solvent, and, as necessary, the binding agent and/or the conductive additive are mixed to prepare a slurry. Examples of the solvent include N-methyl-2-pyrrolidone, methanol, methyl isobutyl ketone, and water. The slurry is applied to the surface of the current collector and thereafter dried. In order to enhance an electrode density, the dried product may be compressed.

As the solid electrolyte, a solid electrolyte usable as a solid electrolyte of a lithium ion secondary battery is adopted as appropriate.

The electrolytic solution contains a nonaqueous solvent and an electrolyte dissolved in the nonaqueous solvent.

As the nonaqueous solvent, cyclic carbonates, cyclic esters, linear carbonates, linear esters, ethers, and the like are used. Examples of the cyclic carbonates include ethylene carbonate, propylene carbonate, butylene carbonate, and vinylene carbonate. Examples of the cyclic esters include gamma butyrolactone, 2-methyl-gamma butyrolactone, acetyl-gamma butyrolactone, and gamma valerolactone. Examples of the linear carbonates include dimethyl carbonate, diethyl carbonate, dibutyl carbonate, dipropyl carbonate, and ethylmethyl carbonate. Examples of the linear esters include propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As the nonaqueous solvent, a compound in which a part or all of hydrogen in the chemical structure of the specific solvent is substituted with fluorine, is also adopted.

Examples of the electrolyte include lithium salts such as $LiClO_4$, $LiAsF_6$, $LiPF_6$, $LiBF_4$, $LiCF_3SO_3$, $LiN(FSO_2)_2$, and $LiN(CF_3SO_2)_2$.

Examples of the electrolytic solution include a solution in which lithium salt is dissolved in a nonaqueous solvent such as ethylene carbonate, dimethyl carbonate, propylene carbonate, or diethyl carbonate such that the concentration of the lithium salt is about 0.5 mol/L to about 1.7 mol/L.

The separator separates the positive electrode and the negative electrode from each other, and allows lithium ions to pass while preventing short-circuiting from occurring due to contact between both the electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. A separator having a multilayer structure is also used.

Next, an example of a production method for producing the lithium ion secondary battery is described.

An electrode assembly is formed from the positive electrode, the negative electrode, and, as necessary, the separator interposed therebetween. The electrode assembly is a laminated type one obtained by stacking the positive electrode, the separator, and the negative electrode, or a wound type one obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly. Furthermore, the lithium ion secondary battery of the present invention preferably executes charging and discharging in a voltage range suitable for a type of an active material contained in the electrode.

The shape of the lithium ion secondary battery of the present invention is not particularly limited, and various shapes such as a cylindrical shape, a square shape, a coin-like shape, and a laminated shape are adopted.

The lithium ion secondary battery of the present invention is mountable to a vehicle. The vehicle may be a vehicle that uses, as all or a part of power source, electrical energy obtained from the lithium ion secondary battery, and examples thereof include electric vehicles and hybrid vehicles. In a case where the lithium ion secondary battery is mounted to the vehicle, a plurality of the lithium ion secondary batteries are preferably connected in series to form an assembled battery. Other than the vehicles, examples of a device to which the lithium ion secondary battery is mounted include various home appliances, office instruments, and industrial instruments, which are driven by batteries, such as personal computers and portable communication devices. In addition, the lithium ion secondary battery of the present invention is preferably used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations, etc., for electric vehicles.

Although embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

The present invention is more specifically described below by means of examples, comparative examples, and the like. The present invention is not limited to these examples.

Example 1

A positive electrode active material of Example 1 was produced as described below.

In 400 mL of pure water, 95 g (361.4 mmol) of nickel sulfate hexahydrate, 4.3 g (11.46 mmol) of aluminum nitrate nonahydrate, 0.62 g (1.88 mmol) of sodium tungstate dihydrate, and 3.4 g (44.7 mmol) of glycolic acid as a chelate compound were dissolved, to prepare a transition-metal-containing aqueous solution.

A molar ratio among nickel, aluminum, and tungsten in the transition-metal-containing aqueous solution was 96.5:3:0.5.

Sodium hydroxide, ammonia water, and pure water were mixed to prepare a basic aqueous solution.

Deposition Step

In a temperature-controlled bath maintained at 60° C., the basic aqueous solution was supplied to the transition-metal-containing aqueous solution under a condition that nitrogen gas was introduced and stirring was performed, to obtain a reaction solution. The pH of the reaction solution was maintained in a range of 10.3 to 10.85, and nickel, aluminum, and tungsten were deposited as transition metal hydroxide. Here, the pH value represents a value itself obtained by measuring the reaction solution by a pH meter.

The transition metal hydroxide was separated through filtration. The transition metal hydroxide was washed with pure water by using an ultrasonic washing machine, and the transition metal hydroxide was thereafter isolated through filtration.

Precursor Forming Step

The transition metal hydroxide was heated at 300° C. for 5 hours under an air atmosphere, to obtain transition metal oxide as a precursor.

Coating Step

To 400 mL of pure water, 30 g of the transition metal oxide was added to prepare a dispersion liquid of the transition metal oxide.

In the water, 0.15 g (0.42 mmol) of zirconium sulfate tetrahydrate and 0.12 g (1.58 mmol) of glycolic acid as a chelate compound were dissolved to prepare a coating solution.

The dispersion liquid of the transition metal oxide and the coating solution were mixed to obtain a mixture solution. Subsequently, aqueous sodium hydroxide solution was added until the pH of the mixture solution reached 12.5, to obtain a coated object having zirconium hydroxide deposited on the surface of the transition metal oxide. The coated object was separated through filtration, and thereafter dried, and supplied for a baking step.

Baking Step

In a mortar, 10 g of the coated object of the precursor, 3.0 g (125 mmol) of anhydrous lithium hydroxide, 0.475 g (1.25 mmol) of $Na_3PO_4$ dodecahydrate, and 0.032 g (1.25 mmol) of LiF were mixed to obtain a mixture. The mixture was heated at 600° C. for 10 hours under an air atmosphere to obtain a first baked object.

The first baked object was crushed in the mortar to obtain a powdered first baked object. The powdered first baked object was heated at 725° C. for 15 hours under an oxygen gas atmosphere, to obtain a second baked object. The second baked object was crushed in the mortar, to obtain a positive electrode active material of Example 1.

The theoretical composition of the positive electrode active material of Example 1 was $Li_1Ni_{0.965}Al_{0.03}W_{0.005}Zr_{0.0011}Na_{0.03}P_{0.01}O_2F_{0.01}$.

A positive electrode and a lithium ion secondary battery according to Example 1 were produced as described below.

Aluminum foil having a thickness of 20 μm was prepared as a current collector for the positive electrode. 94 parts by mass of the positive electrode active material of Example 1 as the positive electrode active material, 3 parts by mass of acetylene black as a conductive additive, and 3 parts by mass of polyvinylidene fluoride as a binding agent were mixed. The mixture was dispersed in an appropriate amount of N-methyl-2-pyrrolidone to produce a slurry. The slurry was placed on the surface of the aluminum foil, and was applied by using a doctor blade until the slurry had a film-like form. The aluminum foil having the slurry applied thereon was heated and dried, to remove N-methyl-2-pyrrolidone through volatilization, thereby forming a positive electrode active material layer on the surface of the aluminum foil. The aluminum foil having the positive electrode active material layer formed on the surface was compressed by using a roll press machine, and the aluminum foil and the positive electrode active material layer were firmly adhered to each other to obtain a joined object. The joined object was heated by using a vacuum drier and cut into a predetermined shape, to obtain the positive electrode.

A negative electrode was produced as described below. 98.3 parts by mass of graphite, and 1 part by mass of styrene-butadiene-rubber and 0.7 parts by mass of carboxymethyl cellulose as binding agents, were mixed, and the obtained mixture was dispersed in an appropriate amount of ion exchanged water, to produce a slurry. The slurry was applied to copper foil having a thickness of 20 µm as a current collector for the negative electrode by using a doctor blade so as to have a film-like form, and the current collector having the slurry applied thereto was dried and thereafter pressed to obtain a joined object. The joined object was heated by using a vacuum drier, and cut into a predetermined shape, to obtain the negative electrode.

A laminated type lithium ion secondary battery was produced by using the positive electrode and the negative electrode described above. Specifically, a rectangular sheet which had a thickness of 25 µm and which was formed of a resin film having a three layer structure of polypropylene/polyethylene/polypropylene was interposed as a separator between the positive electrode and the negative electrode, to form an electrode assembly. The electrode assembly was covered with a set of two laminate films and the three sides were sealed to form a laminate film having a bag-like shape, and, thereafter, an electrolytic solution was injected into the laminate film. As the electrolytic solution, a solution obtained by dissolving 1 mol/L of $LiPF_6$ in a solvent in which ethylene carbonate, ethylmethyl carbonate, and dimethyl carbonate were mixed at a volume ratio of 3:3:4, was used. Thereafter, the remaining one side was sealed to air-tightly seal the four sides, thereby obtaining a laminated-type lithium ion secondary battery of Example 1 in which the electrode assembly and the electrolytic solution were sealed.

Example 2

A positive electrode active material of Example 2 was produced as describe below.

In 400 mL of pure water, 94 g (357.6 mmol) of nickel sulfate hexahydrate, 4.2 g (14.94 mmol) of cobalt sulfate heptahydrate, 0.6 g (1.82 mmol) of sodium tungstate dihydrate, 0.35 g (0.93 mmol) of aluminum nitrate nonahydrate, and 0.28 g (3.68 mmol) of glycolic acid as a chelate compound were dissolved, to prepare a transition-metal-containing aqueous solution.

A molar ratio among nickel, cobalt, tungsten, and aluminum in the transition-metal-containing aqueous solution was 95.5:4:0.5:0.25.

Sodium hydroxide, ammonia water, and pure water were mixed to prepare a basic aqueous solution.
Deposition Step In a temperature-controlled bath maintained at 60° C., the basic aqueous solution was supplied to the transition-metal-containing aqueous solution under a condition that nitrogen gas was introduced and stirring was performed to obtain a reaction solution. The pH of the reaction solution was maintained in a range of 10.8 to 10.85, and nickel, cobalt, tungsten, and aluminum were deposited as transition metal hydroxide. Here, the pH value represents a value itself obtained by measuring the reaction solution by a pH meter.

The transition metal hydroxide was separated through filtration. The transition metal hydroxide was washed with pure water by using an ultrasonic washing machine, and the transition metal hydroxide was thereafter isolated through filtration.

Precursor Forming Step

The transition metal hydroxide was heated at 300° C. for 5 hours under an air atmosphere, to obtain transition metal oxide as a precursor.
Baking Step In a mortar, 10 g of the precursor, 3.0 g (125 mmol) of anhydrous lithium hydroxide, 0.475 g (1.25 mmol) of $Na_3PO_4$ dodecahydrate, and 0.032 g (1.25 mmol) of LiF were mixed to obtain a mixture. The obtained mixture was heated at 600° C. for 10 hours under an air atmosphere to obtain a first baked object.

The first baked object was crushed in the mortar to obtain a powdered first baked object. The powdered first baked object was heated at 725° C. for 15 hours under an oxygen gas atmosphere, to obtain a second baked object. The second baked object was crushed in the mortar to obtain a positive electrode active material of Example 2.

A theoretical composition of the positive electrode active material of Example 2 was $Li_1Ni_{0.955}Co_{0.04}W_{0.005}Al_{0.0025}Na_{0.03}P_{0.01}O_2F_{0.01}$.

A lithium ion secondary battery of Example 2 was produced in the same manner as in Example 1 except that the positive electrode active material of Example 2 was used.

Example 3

A positive electrode active material, a positive electrode, and a lithium ion secondary battery of Example 3 were produced in the same manner as in Example 2 except that a coating step described below was performed between the precursor forming step and the baking step, and a precursor having been subjected to the coating step was used as a precursor in the baking step.

A theoretical composition of the positive electrode active material of Example 3 was $Li_1Ni_{0.955}Co_{0.04}W_{0.005}Al_{0.0025}Zr_{0.002}Na_{0.05}P_{0.01}O_2F_{0.01}$.
Coating Step To 400 mL of pure water, 30 g of the transition metal oxide was added to prepare a dispersion liquid of the transition metal oxide.

In the water, 0.3 g (0.84 mmol) of zirconium sulfate tetrahydrate and 0.25 g (3.29 mmol) of glycolic acid as a chelate compound were dissolved to prepare a coating solution.

The dispersion liquid of the transition metal oxide and the coating solution were mixed to obtain a mixture solution. Subsequently, aqueous sodium hydroxide solution was added until the pH of the mixture solution reached 12.5, to obtain a coated object having zirconium hydroxide deposited on the surface of the transition metal oxide. The coated object was separated through filtration, and thereafter dried, and supplied for the baking step.

Example 4

A positive electrode active material of Example 4 was produced as described below.

In 400 mL of pure water, 94 g (357.6 mmol) of nickel sulfate hexahydrate, 4.2 g (14.94 mmol) of cobalt sulfate heptahydrate, 0.62 g (1.88 mmol) of sodium tungstate dihydrate, 0.35 g (0.93 mmol) of aluminum nitrate nonahydrate, 0.26 g (0.73 mmol) of zirconium sulfate tetrahydrate, and 0.49 g (6.44 mmol) of glycolic acid as a chelate compound were dissolved, to prepare a transition-metal-containing aqueous solution.

A molar ratio among nickel, cobalt, tungsten, aluminum, and zirconium in the transition-metal-containing aqueous solution was 95.5:4:0.5:0.25:0.20.

Sodium hydroxide, ammonia water, and pure water were mixed to prepare a basic aqueous solution.

Deposition Step

In a temperature-controlled bath maintained at 60° C., the basic aqueous solution was supplied to the transition-metal-containing aqueous solution under a condition that nitrogen gas was introduced and stirring was performed, to obtain a reaction solution. The pH of the reaction solution was maintained in a range of 10.8 to 10.85, and nickel, cobalt, tungsten, aluminum, and zirconium were deposited as transition metal hydroxide. Here, the pH value represents a value itself obtained by measuring the reaction solution by a pH meter.

The transition metal hydroxide was separated through filtration. The transition metal hydroxide was washed with pure water by using an ultrasonic washing machine, and the transition metal hydroxide was thereafter isolated through filtration.

Precursor Forming Step

The transition metal hydroxide was heated at 300° C. for 5 hours under an air atmosphere, to obtain transition metal oxide as a precursor.

Baking Step

In a mortar, 10 g of the precursor, 3.0 g (125 mmol) of anhydrous lithium hydroxide, 0.475 g (1.25 mmol) of $Na_3PO_4$ dodecahydrate, and 0.032 g (1.25 mmol) of LiF were mixed to obtain a mixture. The obtained mixture was heated at 600° C. for 10 hours under an air atmosphere to obtain a first baked object.

The first baked object was crushed in the mortar to obtain a powdered first baked object. The powdered first baked object was heated at 725° C. for 15 hours under an oxygen gas atmosphere, to obtain a second baked object. The second baked object was crushed in the mortar to obtain a positive electrode active material of Example 4.

A theoretical composition of the positive electrode active material of Example 4 was $Li_1Ni_{0.955}Co_{0.04}W_{0.005}Al_{0.0025}Zr_{0.002}Na_{0.03}P_{0.01}O_2F_{0.01}$.

A lithium ion secondary battery of Example 4 was produced in the same manner as in Example 1 except that the positive electrode active material of Example 4 was used.

Example 5

A positive electrode active material, a positive electrode, and a lithium ion secondary battery of Example 5 were produced in the same manner as in Example 4 except that a coating step described below was performed between the precursor forming step and the baking step, and a precursor having been subjected to the coating step was used as a precursor in the baking step.

A theoretical composition of the positive electrode active material of Example 5 was $Li_1Ni_{0.955}Co_{0.04}W_{0.005}Al_{0.0025}Zr_{0.004}Na_{0.03}P_{0.01}O_2F_{0.01}$.

Coating Step

To 400 mL of pure water, 30 g of the transition metal oxide was added to prepare a dispersion liquid of the transition metal oxide.

In the water, 0.26 g (0.73 mmol) of zirconium sulfate tetrahydrate and 0.21 g (2.76 mmol) of glycolic acid as a chelate compound were dissolved to prepare a coating solution.

The dispersion liquid of the transition metal oxide and the coating solution were mixed to obtain a mixture solution. Subsequently, aqueous sodium hydroxide solution was added until the pH of the mixture solution reached 12.5, to obtain a coated object having zirconium hydroxide deposited on the surface of the transition metal oxide. The coated object was separated through filtration, and thereafter dried, and was supplied for the baking step.

Comparative Example 1

$LiNi_{0.85}Co_{0.11}Al_{0.04}O_2$ which had a layered rock-salt structure and was produced by a conventional coprecipitation method in which no chelate compound was used in the deposition step, was prepared and used as a positive electrode active material of Comparative example 1.

A lithium ion secondary battery of Comparative example 1 was produced in the same manner as in Example 1 except that the positive electrode active material of Comparative example 1 was used.

Evaluation Example 1

Argon ion beams were applied to the positive electrode active material of Example 1 fixed by resin, to produce a thin film having a thickness of about 100 nm. An STEM-EDX having a combination of a scanning transmission electron microscope and an energy dispersive X-ray spectrometric analyzer was used to analyze Ni, Al, and W as targets to be measured in a range of a length size of 20 nm×a transverse size of 20 nm on the cross-section of the primary particle in the positive electrode active material of Example 1 formed on the thin film. A proportion (%) of Al to the total of Ni, Al, and W was calculated.

The analysis was performed at five locations on the cross-section of a specific primary particle. The analysis was also performed at five locations on the cross-section of another primary particle and further performed at five locations on the cross-section of still another primary particle.

The analysis was similarly performed also for the positive electrode active material of Example 2. Targets to be measured in the positive electrode active material of Example 2 were Ni, Co, W, and Al. For the positive electrode active material of Example 2, a proportion (%) of Al to the total of Ni, Co, W, and Al was calculated.

The analysis was similarly performed also for the positive electrode active material of Comparative example 1. Targets to be measured in the positive electrode active material of Comparative example 1 were Ni, Co, and Al. For the positive electrode active material of Comparative example 1, a proportion (%) of Al to the total of Ni, Co, and Al was calculated.

Table 1 indicates the results of the above-described evaluations. Analysis values in Table 1 are represented as atom % of Al.

Figure 2:
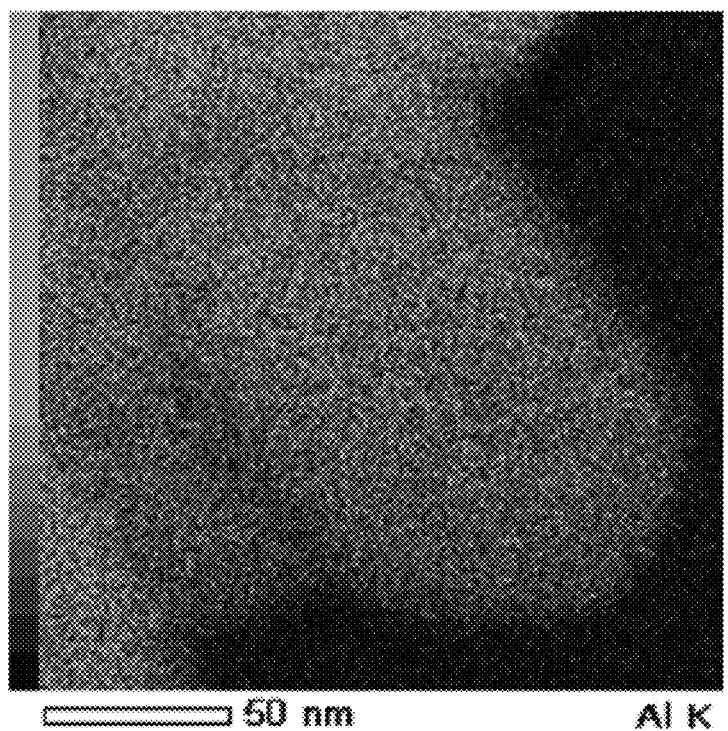
FIG. 2 illustrates an STEM-EDX image in which Al in the positive electrode active material of Example 1 is a target to be measured.

FIG. 1 illustrates an STEM image of the positive electrode active material of Example 1. FIG. 2 illustrates an STEM-EDX image in which Al was a target to be measured.

TABLE 1

|  | Example 1 | | | Example 2 | | | Comparative example 1 | | |
| --- | --- | --- | --- | --- | --- | --- | --- | --- | --- |
|  | Particle 1 | Particle 2 | Particle 3 | Particle 1 | Particle 2 | Particle 3 | Particle 1 | Particle 2 | Particle 3 |
| Range 1 | 2.04 | 2.06 | 2.98 | 0.46 | 0.45 | 0.23 | 2.59 | 2.64 | 2.32 |
| Range 2 | 2.23 | 2.33 | 3.26 | 0.34 | 0.47 | 0.21 | 10.24 | 6.79 | 3.46 |
| Range 3 | 2.06 | 2.43 | 3.34 | 0.40 | 0.36 | 0.18 | 3.01 | 7.52 | 2.70 |
| Range 4 | 2.10 | 2.35 | 3.53 | 0.52 | 0.37 | 0.19 | 2.44 | 3.30 | 1.70 |
| Range 5 | 2.10 | 1.93 | 2.87 | 0.45 | 0.38 | 0.24 | 5.17 | 1.84 | 4.02 |
| Average | 2.11 | 2.22 | 3.20 | 0.43 | 0.41 | 0.21 | 4.69 | 4.42 | 2.84 |
| Standard deviation | 0.074 | 0.214 | 0.269 | 0.068 | 0.050 | 0.025 | 3.288 | 2.564 | 0.918 |
| Relative standard deviation (%) | 3.5 | 9.6 | 8.4 | 15.6 | 12.4 | 12.1 | 70.1 | 58.0 | 32.3 |

In the positive electrode active materials of Example 1 and Example 2, Al was found to be dispersed uniformly in each of the primary particles. Meanwhile, in the positive electrode active material of Comparative example 1, Al was found to be non-uniformly present in each of the primary particles.

According to the above-described results, use of the chelate compound in the deposition step is considered to have contributed to uniform dispersion of aluminum. Meanwhile, in the positive electrode active material of Comparative example 1 in which no chelate compound was used in the deposition step, segregation of aluminum hydroxide is assumed to have occurred in the deposition step.

In the positive electrode active materials of Example 1 and Example 2, the average value of Al is considered to have varied on the cross-section among the primary particles due to an apparent crystal face (crystal orientation) appearing on the cross-section of the primary particle being different.

Evaluation Example 2

Image analysis of an STEM image of the positive electrode active material of Example 1 which was obtained in the same manner as in Evaluation example 1 was performed, and a cross-sectional area of the primary particle was calculated. A diameter was calculated on the assumption that the primary particle had a round cross-section. The analysis was performed for 20 primary particles.

The analysis was similarly performed also for the positive electrode active materials of Example 2 and Comparative example 1.

Table 2 indicates the results of the above-described evaluations. The particle diameters indicated in Table 2 represent calculated diameters.

TABLE 2

| Primary particle | Example 1 | | Example 2 | | Comparative example 1 | |
| --- | --- | --- | --- | --- | --- | --- |
|  | Cross-sectional area ($\mu m^2$) | Particle diameter ($\mu m$) | Cross-sectional area ($\mu m^2$) | Particle diameter ($\mu m$) | Cross-sectional area ($\mu m^2$) | Particle diameter ($\mu m$) |
| No. 1 | 0.01226 | 0.1249 | 0.03911 | 0.2231 | 0.65527 | 0.9134 |
| No. 2 | 0.00484 | 0.0785 | 0.01793 | 0.1511 | 1.29449 | 1.2838 |
| No. 3 | 0.00606 | 0.0878 | 0.03654 | 0.2157 | 0.61035 | 0.8815 |
| No. 4 | 0.00473 | 0.0776 | 0.02422 | 0.1756 | 0.41626 | 0.7280 |
| No. 5 | 0.00547 | 0.0835 | 0.01254 | 0.1264 | 0.20693 | 0.5133 |
| No. 6 | 0.02520 | 0.1791 | 0.01627 | 0.1439 | 0.47080 | 0.7742 |
| No. 7 | 0.01077 | 0.1171 | 0.01418 | 0.1344 | 0.74991 | 0.9771 |
| No. 8 | 0.00248 | 0.0562 | 0.01357 | 0.1315 | 0.63040 | 0.8959 |
| No. 9 | 0.00748 | 0.0976 | 0.00873 | 0.1054 | 0.42508 | 0.7357 |
| No. 10 | 0.00979 | 0.1117 | 0.02881 | 0.1915 | 0.25986 | 0.5752 |
| No. 11 | 0.00720 | 0.0957 | 0.01072 | 0.1168 | 0.42829 | 0.7385 |
| No. 12 | 0.00388 | 0.0703 | 0.01797 | 0.1512 | 0.13795 | 0.4191 |
| No. 13 | 0.01604 | 0.1429 | 0.01229 | 0.1251 | 0.16121 | 0.4531 |
| No. 14 | 0.00771 | 0.0991 | 0.01742 | 0.1489 | 0.05294 | 0.2596 |
| No. 15 | 0.00898 | 0.1069 | 0.01941 | 0.1572 | 0.13073 | 0.4080 |
| No. 16 | 0.00791 | 0.1003 | 0.01556 | 0.1408 | 0.31921 | 0.6375 |
| No. 17 | 0.00466 | 0.0770 | 0.01732 | 0.1485 | 0.13956 | 0.4215 |
| No. 18 | 0.00187 | 0.0488 | 0.01389 | 0.1330 | 0.23099 | 0.5423 |
| No. 19 | 0.00539 | 0.0828 | 0.01270 | 0.1272 | 0.09785 | 0.3530 |
| No. 20 | 0.01874 | 0.1545 | 0.04212 | 0.2316 | 0.13314 | 0.4117 |
| Average | 0.00857 | 0.0996 | 0.01956 | 0.1539 | 0.3776 | 0.6461 |
| Standard deviation | 0.00578 | 0.0323 | 0.00965 | 0.0357 | 0.3011 | 0.2580 |
| Relative standard deviation (%) | 67.39 | 32.42 | 49.33 | 23.20 | 79.75 | 39.93 |

In the positive electrode active material of Example 1, the particle diameter of the primary particle was about 100 nm. In the positive electrode active material of Example 2, the particle diameter of the primary particle was about 150 nm. Both of the particle diameters were considered to be relatively small particle diameters.

Example 5 and Comparative example 1 was charged at 0.1C rate up to 4.4 V and discharged to 2.5 V, was repeated.

Table 4 indicates a discharge capacity at the first charging/discharging cycle, and a discharge capacity at a time when the charging/discharging cycle had been repeatedly performed 20 times.

TABLE 4

|  | Metal composition ratio in deposition step | | | | | Discharge capacity (First cycle) | Discharge capacity (time when 20 cycles had been performed) |
| --- | --- | --- | --- | --- | --- | --- | --- |
|  | Ni | Co | W | Al | Zr | | |
| Example 1 | 96.5 | — | 0.5 | 3 | — | 240 mAh/g | 222 mAh/g |
| Example 2 | 95.5 | 4 | 0.5 | 0.25 | — | 249 mAh/g | 229 mAh/g |
| Example 3 | 95.5 | 4 | 0.5 | 0.25 | — | 246 mAh/g | 234 mAh/g |
| Example 4 | 95.5 | 4 | 0.5 | 0.25 | 0.2 | 244 mAh/g | 226 mAh/g |
| Example 5 | 95.5 | 4 | 0.5 | 0.25 | 0.2 | 235 mAh/g | 232 mAh/g |
| Comparative example 1 | 85 | 11 | — | 4 | — | 218 mAh/g | 208 mAh/g |

Evaluation Example 3

The particle size distribution in the positive electrode active material of Example 2 was measured by using a laser scattering/diffraction type particle size distribution analyzer. The measurement was similarly performed also for the positive electrode active material of Comparative example 1. In Evaluation example 3, a target to be measured was mainly a secondary particle of the positive electrode active material.

Table 3 indicates results of $D_{90}$, $D_{10}$, $D_{50}$, and the like in each of the positive electrode active materials. In Table 3, units for $D_{90}$, $D_{10}$, $D_{50}$, and $D_{90}$-$D_{10}$ are each µm.

TABLE 3

|  | $D_{90}$ | $D_{10}$ | $D_{50}$ | $D_{90}$-$D_{10}$ | ($D_{90}$-$D_{10}$)/$D_{50}$ |
| --- | --- | --- | --- | --- | --- |
| Example 2 | 23.86 | 6.724 | 12.57 | 17.14 | 1.363 |
| Comparative example 1 | 16.06 | 8.417 | 11.22 | 7.64 | 0.681 |

According to the results in Table 3, the positive electrode active material of Example 2 is considered to have a relatively broad particle size distribution.

Evaluation Example 4

For the positive electrode active materials of Example 1 to Example 5, crystal structures were analyzed by using a powder X-ray diffractometer in which Cu-κα was used.

Each of the positive electrode active materials was confirmed to indicate a diffraction pattern of a layered rock-salt structure.

Evaluation Example 5

A charging/discharging cycle in which the lithium ion secondary battery according to each of Example 1 to The results in Table 4 indicate that the lithium ion secondary batteries of Example 1 to Example 5 are each considered to have a discharge capacity greater than that of the lithium ion secondary battery of Comparative example 1, and to be excellent in maintaining a discharge capacity.

The invention claimed is:

1. A positive electrode active material production method, comprising:
   a deposition step of mixing a basic substance and an aqueous solution in which nickel, aluminum, and a chelate compound are dissolved to form a transition-metal-containing aqueous solution, and depositing transition metal hydroxide containing nickel and aluminum;
   a precursor forming step of heating the transition metal hydroxide and forming a precursor in which attached water has been removed or forming a precursor that is transition metal oxide;
   a baking step of mixing and baking the precursor and lithium salt, wherein
   the chelate compound is hydroxycarboxylic acid,
   a molar ratio of hydroxycarboxylic acid to aluminum in the transition-metal-containing aqueous solution is in a range of 2 to 6,
   the transition-metal-containing aqueous solution contains 0.001 to 0.05 moles of aluminum with respect to 0.85 to 0.99 moles of nickel, and; and
   wherein the method further comprises a coating step of coating the precursor with a metal compound after the precursor forming step and before the baking step.

2. The positive electrode active material production method according to claim 1, wherein the transition-metal-containing aqueous solution contains 0.001 to 0.03 moles of aluminum with respect to 0.85 to 0.99 moles of nickel.

3. The positive electrode active material production method according to claim 1, wherein the transition-metal-containing aqueous solution contains 0.001 to 0.01 moles of aluminum with respect to 0.85 to 0.99 moles of nickel.

4. The positive electrode active material production method according to claim 1, wherein the chelate compound is glycolic acid.

5. The positive electrode active material production method according to claim 1, wherein the following coat-1), coat-2), and coat-3) are sequentially performed in this order:
- coat-1) a dispersion liquid preparation step of dispersing the transition metal oxide in water;
- coat-2) a zirconium deposition step of mixing the dispersion liquid and a zirconium aqueous solution containing a chelate compound, to deposit zirconium hydroxide on a surface of the transition metal oxide;
- coat-3) a step of drying the transition metal oxide having the zirconium hydroxide deposited on the surface, to obtain a coated object.

6. The positive electrode active material production method according to claim 5, wherein a molar ratio of the chelate compound to zirconium in the zirconium aqueous solution is not less than 1.

* * * * *